(12) United States Patent
Basak et al.

(10) Patent No.: US 11,455,392 B2
(45) Date of Patent: Sep. 27, 2022

(54) METHODS AND APPARATUS OF ANOMALOUS MEMORY ACCESS PATTERN DETECTION FOR TRANSLATIONAL LOOKASIDE BUFFERS

(71) Applicant: Intel Corporation, Santa Clara, CA (US)

(72) Inventors: Abhishek Basak, Hillsboro, OR (US); Li Chen, Hillsboro, OR (US); Salmin Sultana, Hillsboro, OR (US); Anna Trikalinou, Hillsboro, OR (US); Erdem Aktas, Beaverton, OR (US); Saeedeh Komijani, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 708 days.

(21) Appl. No.: 16/370,849

(22) Filed: Mar. 29, 2019

(65) Prior Publication Data

US 2019/0228155 A1    Jul. 25, 2019

Related U.S. Application Data

(60) Provisional application No. 62/754,571, filed on Nov. 1, 2018.

(51) Int. Cl.
*G06F 21/56* (2013.01)
*G06F 12/1027* (2016.01)
(Continued)

(52) U.S. Cl.
CPC ........ *G06F 21/566* (2013.01); *G06F 12/1027* (2013.01); *G06F 21/552* (2013.01);
(Continued)

(58) Field of Classification Search
CPC .. G06F 21/566; G06F 21/1027; G06F 21/554; G06F 21/79; G06N 20/00
See application file for complete search history.

(56) References Cited

U.S. PATENT DOCUMENTS

| 10,706,147 | B1 * | 7/2020 | Pohlack | G06F 12/0811 |
|---|---|---|---|---|
| 2017/0286421 | A1 * | 10/2017 | Hayenga | G06F 9/3842 |
| 2018/0083833 | A1 * | 3/2018 | Zoll | H04L 41/069 |

FOREIGN PATENT DOCUMENTS

WO    WO-2009097610 A1 *  8/2009  ........... G06F 21/552

* cited by examiner

*Primary Examiner* — Meng Li
*Assistant Examiner* — Shu Chun Gao
(74) *Attorney, Agent, or Firm* — Hanley, Flight & Zimmerman, LLC

(57) ABSTRACT

Methods, apparatus, systems and articles of manufacture are disclosed for anomalous memory access pattern detection for translational lookaside buffers. An example apparatus includes a communication interface to retrieve a first eviction data set from a translational lookaside buffer associated with a central processing unit; a machine learning engine to: generate an anomaly detection model based upon at least one of a second eviction data set not including an anomaly and a third eviction data set including the anomaly; and determine whether the anomaly is present in the first eviction data set based on the anomaly detection model; and an alert generator to at least one of modify a bit value or terminate memory access operations when the anomaly is determined to be present.

21 Claims, 6 Drawing Sheets

(51) Int. Cl.
*G06N 20/00* (2019.01)
*G06F 21/55* (2013.01)
*G06F 21/79* (2013.01)

(52) U.S. Cl.
CPC ............ G06F 21/554 (2013.01); G06F 21/79 (2013.01); G06N 20/00 (2019.01); *G06F 2212/68* (2013.01); *G06F 2221/034* (2013.01)

METHODS AND APPARATUS OF ANOMALOUS MEMORY ACCESS PATTERN DETECTION FOR TRANSLATIONAL LOOKASIDE BUFFERS

RELATED APPLICATIONS

This patent is a non-provisional of and claims the benefit of U.S. Patent Application Ser. No. 62/754,571, filed Nov. 1, 2018, entitled "METHODS AND APPARATUS OF ANOMALOUS MEMORY ACCESS PATTERN DETECTION FOR TRANSLATION LOOKASIDE BUFFERS." U.S. Patent Application Ser. No. 62/754,571 is hereby incorporated by reference herein in its entirety.

FIELD OF THE DISCLOSURE

This disclosure relates generally to anomaly detection, and, more particularly, to anomalous memory access pattern detection for translational lookaside buffers.

BACKGROUND

In recent years, software visible micro-architectural side channel attacks on data caches such as translation look-aside buffers (TLBs) in a central processing unit (CPU) memory management unit (MMU) have begun to present a point of vulnerability for timing based side channels. TLBs (both DTLB (Data TLB)/ITLB (Instruction TLB)) have a similar structure as data caches (set-associative), where tags constitute virtual addresses and the data includes physical addresses.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Figure 1:
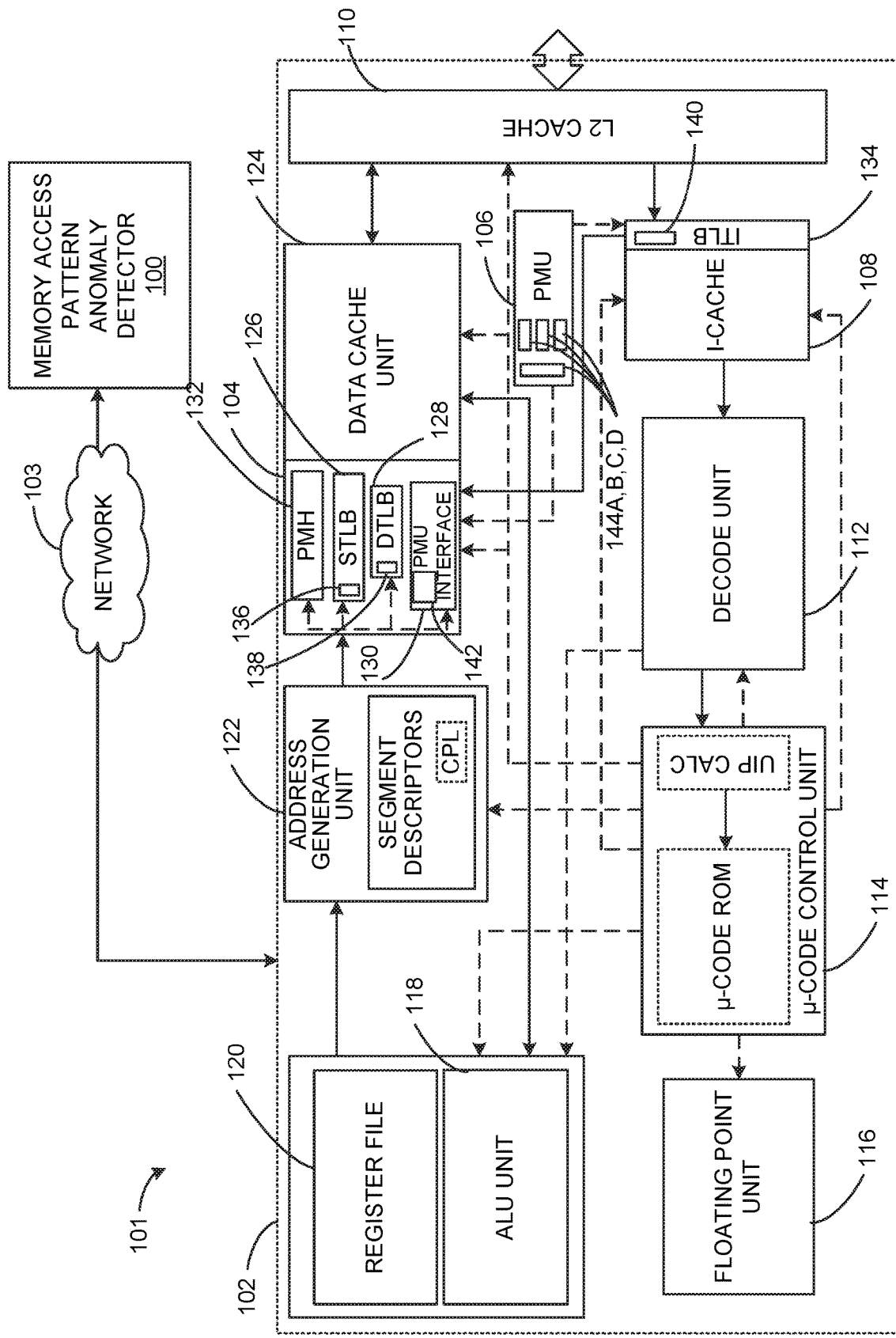
FIG. 1 is a block diagram of an example environment of use for an example memory access pattern anomaly detector constructed in accordance with teachings of this disclosure to determine anomalous memory access patterns.

In addition to software visible micro-architectural side channel attacks on data caches, translation look-aside buffers (TLBs) in a central processing unit (CPU) memory management unit (MMU) present another point of vulnerability for timing based side channels. TLBs (both DTLB (Data TLB)/ITLB (Instruction TLB)) have a similar structure as data caches (set-associative), where tags constitute virtual addresses with the data being physical addresses.

In an example of a prime and probe type attack on the TLBs, an attacker using eviction sets can monitor access patterns of a victim in terms of one or more pages it accessed. Often, in sensitive code like crypto-code, based on which code or data pages are accessed, information on secret data (e.g., user data, password data, browsing history, etc.) may be leaked in a traditional side channel setting. Due to the smaller sizes of TLBs, the channel bandwidth may be lower compared to a data cache subsystem. However, the channel bandwidth may be large enough to leak bits of secret data every few iterations.

Turning to the effects of speculative execution, victim page accesses to devices can be forced speculatively through controlling/manipulating states of predictor structures. A read out of speculative state can be performed by extending contention or flush based approaches. With next-generation data cache subsystems, an attack can include searching for the next available channel for encoding secret (e.g., architectural or speculative) info, for which TLBs are an example candidate. For avoiding hardware pre-fetcher noise in data cache side channels, the encoding of secret data access is often spread out at page granularities (e.g. arr2[4096*secret]), aiding in the setup of TLB channels.

Turning to TLB control through software, x-86 INVLPG instructions can be used in some examples to invalidate certain page mapping from the TLB in the right PCID context. Although executed only at Ring 0, thereby preventing one process from directly evicting a TLB mapping for, in some examples, a shared library page (in contrast with CLFLUSH to flush shared pages in Flush+Reload attack), the attack is possible for inter virtual machine (VM) or container domains with features like deduplication. Thus, both Prime and Probe and Flush and Reload attacks may be performed for TLBs as well.

Example disclosed herein attempt to detect anomalous program execution behavior (e.g., using CPU instrumentation) in terms of page accesses (thereby TLB set access patterns) compared to typical program characteristics. Through monitoring access patterns (over time across different domains) to selectable critical set(s) and comparing the monitored characteristics to characteristics of typical software execution, anomalies can be flagged to system software as a potential occurrence of timing side channel attacks pertaining to TLB. It is desirable to reduce instances of False positives. In some examples disclosed herein, CPU instrumentation/hooks are introduced to enhance efficiency of detection of TLB timing channel attacks and catch such attacks via anomaly detection principles.

Disclosed herein include example methodologies based on CPU instrumentation to detect anomalous set access patterns by different agents (often different domains) over time for TLB structures (DTLB/STLB and I-TLB). Collected data is fed into machine learning algorithms to detect potential anomalous behavior, thereby signaling a probable side channel threat to the system software (e.g., in near real time). In response, based on security criticality, the system software may perform simple preventive approaches like isolating these agents (e.g. processes/VMs) on different cores/processors etc. Disclosed examples also propose optimization schemes involving security sensitive programs giving protection hints through software directives (like data or page in its address space it wants to protect (e.g. keys and intermediate key states in crypto libraries)) in certain scenarios and the proposed detection methodology incorporates these to enhance efficiency of anomalous behavior detection at minimal resource requirement/consumption.

Some examples disclosed herein make use of a variety of CPU instrumentation to monitor TLB activity at run time and feed collected monitoring data to a machine learning based anomaly detection program (e.g., a locally running program) to detect and flag a potential onset of side channel attacks (e.g., at near real time).

Presently existing Performance Monitoring Unit(s) (PMU(s)) consist of TLB related event monitoring like measuring number of DTLB hits, misses, STLB hits and misses as well as PMH walk instances. These can be filtered by process ID (with help of run time system) such that the TLB related event counts can be isolated for different processes. Although this information is beneficial for a PMU's goals (e.g., for assisting in performance profiling for different programs), it is too coarse for detecting potential side channel attacks with high confidence.

Hence, examples disclosed herein propose side channel aware TLB related event types to be monitored in the PMU. The actual counters in the PMU may be increased or kept the same based on simultaneous monitoring requirements. In some examples of the TLB and/or cache side channel attack methods via the generic Prime & Probe attacks, the attacker uses knowledge of the potential victim source code and analysis associated with identifying randomization of data/code segments (due to address space layout randomization (ASLR)) to identify data dependent upon security critical data or code pages whose accesses by a victim it wants to monitor. From these page addresses (virtual) and open source knowledge and/or manual reverse-engineering of the TLB set mapping function (e.g., similar to data cache unit (DCU), memory latency checker (MLC), last-level cache (LLC), etc.), the attacker can zone in on the TLB set(s) they map onto. These would constitute the "eviction sets" (in cache terminology for Prime and Probe) for the intended side channel attack.

The attacker can then prime (e.g., fill) these TLB sets by reading or writing code or data pages from its own address space. Any co-occurring victim thread (e.g., hyperthreading) or time shared victim process on the same core may consequently (after some trial and error attempts from attacker) access some security-critical data dependent data or code. These perturb the TLB eviction sets by replacing one or more of the attacker process page table entries from the sets. A simultaneous or consequently scheduled attacker thread can read its primed pages corresponding to the TLB eviction sets and determine whether the corresponding page table entries (PTEs) were evicted by the victim based on timing. Hence, the secret data bit(s) can be extracted and the process can be iterative. Further, for detection of potential TLB side channels, the activity around occupancy of these particular "eviction sets" are necessary to detect the onset of attacks with reasonably high confidence (e.g., false positives may exist as these patterns could exist in legitimate program flows). Hence, fine grained set-based TLB fill/evict activity monitoring approaches are required.

Thus, examples disclosed herein add additional event types in a PMU for TLBs, such that TLB set(s) for the CPU to monitor (assume both filling and eviction of ways of these sets) can be programmed. Depending on number of parallel sets desired to be monitored at once, the number of PMU counters may be increased. Moreover, as the number of such security critical data dependent code and data pages are typically inconsequential per process, the number of possible eviction sets is also inconsequential. Hence, disclosed examples are light-weight in terms of cost. Besides, for the system software (OS) or run time system to be aware of the aforementioned potential security critical data dependent pages, a security sensitive program (potential victim of side channel attack) can enumerate a beginning and end of security sensitive code and data (could be multiple such ranges) by new directives/program instrumentation to communicate them with run time. The run time system/OS, with the knowledge of TLB set map function on a particular platform (through proper enumeration) as well as ASLR induced random offsets, can zone in on potential "eviction" sets for TLB for the program and programs monitoring of the TLB sets via PMU events and TLB side additions when the victim is scheduled.

Thus, examples disclosed herein include implementation of an anomaly detector using normal light-weight machine learning (ML) based algorithms like stacked Gated Recurrent Unit (GRU) anomaly detector, Support Vector Machine (SVM), or Random Forest classifiers. The OS may perform non-pervasive mitigatory actions like scheduling the probable "attacker" thread on a different core or processor or enable certain u-arch features for hard partitioning the TLB according to process ID, thread ID, etc.

FIG. 1 is a block diagram of an example environment 101 in which an example memory access pattern anomaly detector 100 receives data and/or transmits data to an example central processing unit (CPU) 102 operating in the example environment of use 101 to detect anomalies indicative of an attack.

The example memory access pattern anomaly detector 100 of FIG. 1 is a computing device configured and/or structured to analyze memory access information reported by the example CPU 102 via an example network 103. Alternatively, the memory access pattern anomaly detector 100 may be implemented in the CPU 102. In other examples, the memory access pattern anomaly detector 100 is implemented independently or in another component and is in communication with the CPU 102. The example memory access pattern anomaly detector 100 utilizes machine learning techniques to detect memory access patterns indicative of an attack. An example implementation of the memory access pattern anomaly detector 100 is described in conjunction with FIG. 2

The example CPU 102 of FIG. 1 includes at least an example memory management unit 104, an example performance monitoring unit (PMU) 106, and an example instruction cache unit 108, which are relevant to the memory access pattern analysis techniques disclosed herein. Alternatively, the CPU 102 may include fewer components (e.g., one of the memory management unit 104 or the instruction cache 108). Additionally or alternatively, the CPU 102 may include other components that include translation lookaside buffers. The example CPU 102 additionally includes other components that are components of standard CPUs including a level 2 cache 110, a decode unit 112, a microcode control unit 114, a floating point unit 116, an arithmetic logic unit 118, a register file 120, an address generation unit 122, and an example data cache unit 124.

The memory management unit 104 of the illustrated example includes an example second level TLB (STLB) 126, an example data TLB (DTLB) 128, an example PMU interface 130, and an example page miss handler 132. The example instruction cache 108 includes an example instruction TLB (ITLB) 134. According to the illustrated example, the TLBs 126, 128, and 134 have been upgraded to include instrumentation to support additional counters utilized by the performance monitoring unit for side channel attack detection. According to the illustrated example, the TLBs 126, 128, and 134 include a monitors 136, 138, and 140, respectively. Additionally, the example PMU interface 142 includes an example monitor 140. The example monitors 136-140 include a set selection decoder and an indicator (e.g., a fill indicator, an evict indicator, a read indicator, and/or a write indicator) to increment corresponding events in the PMU 106. Thus, the example monitors 136-140 send TLB activity (e.g., TLB events, eviction data sets, etc.) to the example PMU 106, which collects counts and enables access to the counts by the example memory access pattern anomaly detector 100.

The example PMU 106 includes example counter(s) 144A,B,C,D for tracking activity of the TLBs 126, 128, and 134. The example counter(s) 144A,B,C,D include decoding logic that programs the new TLB events to be monitored (e.g., by extending unused event selector register values for these new events architecturally (e.g., for all programs to use)). While four example counts 144A,B,C,D are illustrated, any number of counters may be included in the example PMU 106.

Figure 2:
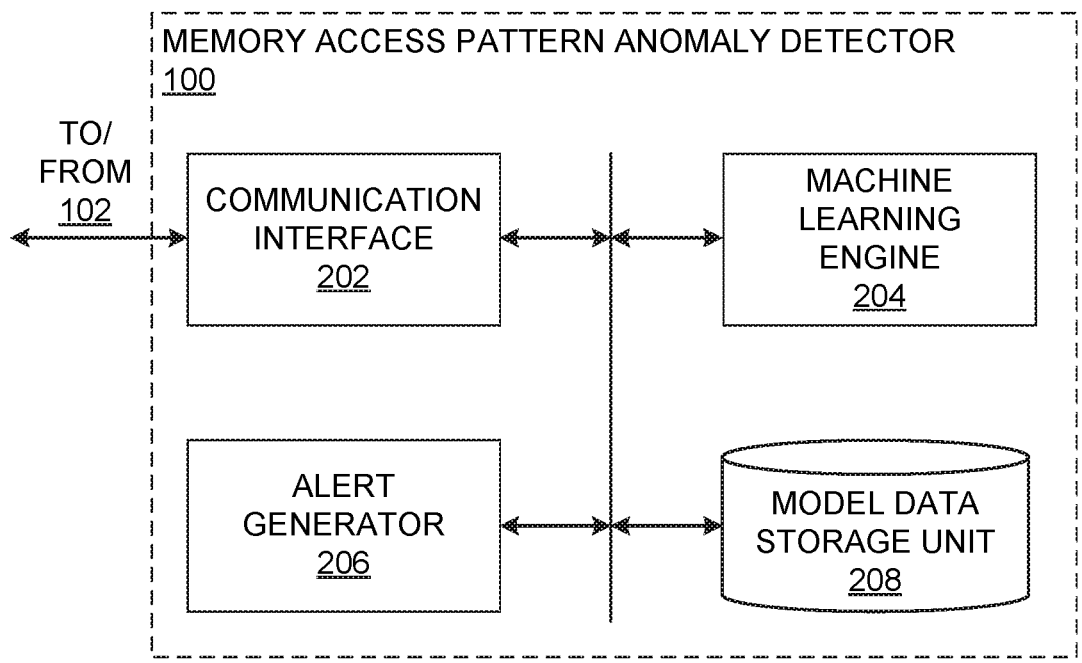
FIG. 2 is a block diagram of the example memory access pattern anomaly detector of FIG. 1 to determine anomalous memory access patterns in accordance with teachings of this disclosure.

FIG. 2 is block diagram of an example implementation of the example memory access pattern anomaly detector 100 of FIG. 1. In some examples, the memory access pattern anomaly detector 100 receives TLB activity at run time from the PMU 106 and utilizes machine learning based anomaly detection to detect and flag a potential onset of side channel attacks. The example memory access pattern anomaly detector 100 includes an example communication interface 202, an example machine learning engine 204, an example alert generator 206, and an example model data storage unit 208.

The example communication manager 202 of FIG. 2 is capable of at least one of transferring data to and receiving data from the CPU 102. Additionally or alternatively, the example communication manager 202 distributes data received from the CPU 102 to at least one of the machine learning engine 204, the alert generator 206, and/or the model data storage unit 208 (e.g., structures internal to the memory access pattern anomaly detector 100). Additionally or alternatively, the example communication manager 202 distributes data generated by structures internal to the example memory access pattern anomaly detector 100 to the CPU 102.

In some examples, the communication manager 202 can be implemented by any type of interface standards, such as an Ethernet interface (wired and/or wireless), a universal serial bus (USB), and/or a PCI express interface. Further, the interface standard of the example communication manager 202 is to at least one of match the interface of the CPU 102 or be converted to match the interface and/or standard of the CPU 102. In some examples, the communication interface 202 converts data received from the CPU 102 into a format processable by a machine learning model (e.g., a machine learning model generated by the machine learning engine 204) and/or inserted into an algorithm generated by a machine learning mode The example machine learning engine 204 of FIG. 2 generates a model that determines whether a memory access pattern is normal or anomalous (e.g., potentially associated with a side channel attack) utilizing machine learning techniques (e.g., such as an SVM learning model, a GRU learning model, Random Forest classifiers, etc.). In some examples, the model is generated based upon at least one of standard memory access patterns (e.g., not included an anomaly) and/or anomalous memory access patterns. In some examples, the machine learning engine 204 additionally implements the machine learned model and, in such examples, outputs an indication that a memory access pattern is one of standard or anomalous to the example alert generator 206.

The example alert generator 206 of FIG. 2 generates an alert in response to the output of the machine learning engine 204 indicating a memory access pattern anomaly detection that, in some examples, can be associated with a TLB side channel attack. In some examples, generating an alert further includes setting one or more bits high (e.g., set to a value of 1, etc.) in response to detecting the memory access pattern anomaly.

Additionally or alternatively, generating an alert further includes setting one or more flags associated with a potential side channel attack when the memory access pattern anomaly is detected. Additionally or alternatively, the alert generator 206 can, in some examples, instruct the example CPU 102 of FIG. 1 to discontinue memory access operations in response to detecting the memory access pattern anomaly. Conversely, in response to detecting standard memory access operations, the example alert generator 206 can at least one of set one or more bits low (e.g., set to a value of 0), remove one or more flags associated with a potential side channel attack, and/or instruct the example CPU 102 of FIG. 1 to continue standard memory access operations.

The example model data storage unit 208 of FIG. 2 stores one or more memory access pattern data set(s), one or more eviction set(s), one or more bit(s) and/or flag(s) set by the alert generator 206, and/or one or more memory access pattern model(s) generated by the machine learning engine 204. The example model data storage unit 208 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example model data storage unit 208 may additionally or alternatively be implemented by one or more double data rate (DDR) memories, such as DDR, DDR2, DDR3, mobile DDR (mDDR), etc. The example model data storage unit 208 may additionally or alternatively be implemented by one or more mass storage devices such as hard disk drive(s), compact disk drive(s), digital versatile disk drive(s), etc. While the illustrated example of FIG. 2 illustrates the example model data storage unit 208 as a single database, the example model data storage unit 208 may be implemented by any number and/or type(s) of databases. Further, the model data storage unit 208 may be located in the example memory access pattern anomaly detector 100 or at a central location outside of the example memory access pattern anomaly detector 100. Furthermore, the data stored in the example model data storage unit 208 may be in any data format such as, for example, binary data, comma delimited data, tab delimited data, structured query language (SQL) structures, etc.

Figure 3:
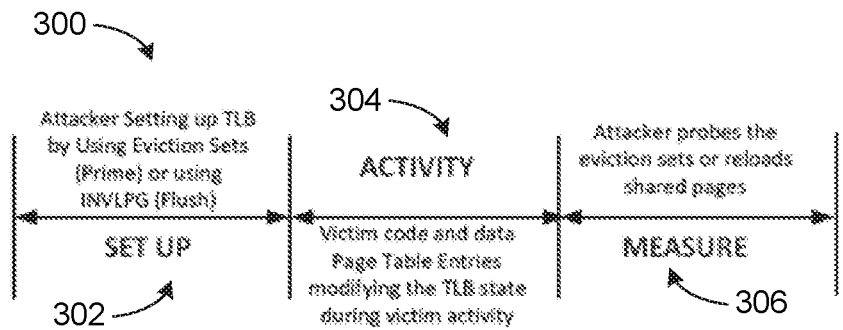
FIG. 3 is an illustration of an example micro-architectural side channel attack.

FIG. 3 illustrates an example micro-architectural side channel attack 300. In the illustrated example of FIG. 3, the attack 300 includes three phases 302, 304, 306 with respect to CPU TLBs. For TLBs, phase 302 includes setup by the attacker via priming (read) or flushing (invalidate translation lookaside buffer entry (INVLPG)). Additionally, phase 304 includes victim activity involving a read of security critical data dependent data and/or code pages. Further, phase 306 includes an attacker measuring TLB state changes on eviction sets to access data (e.g., the attacker may probe the eviction sets or reload shared pages).

Figure 4:
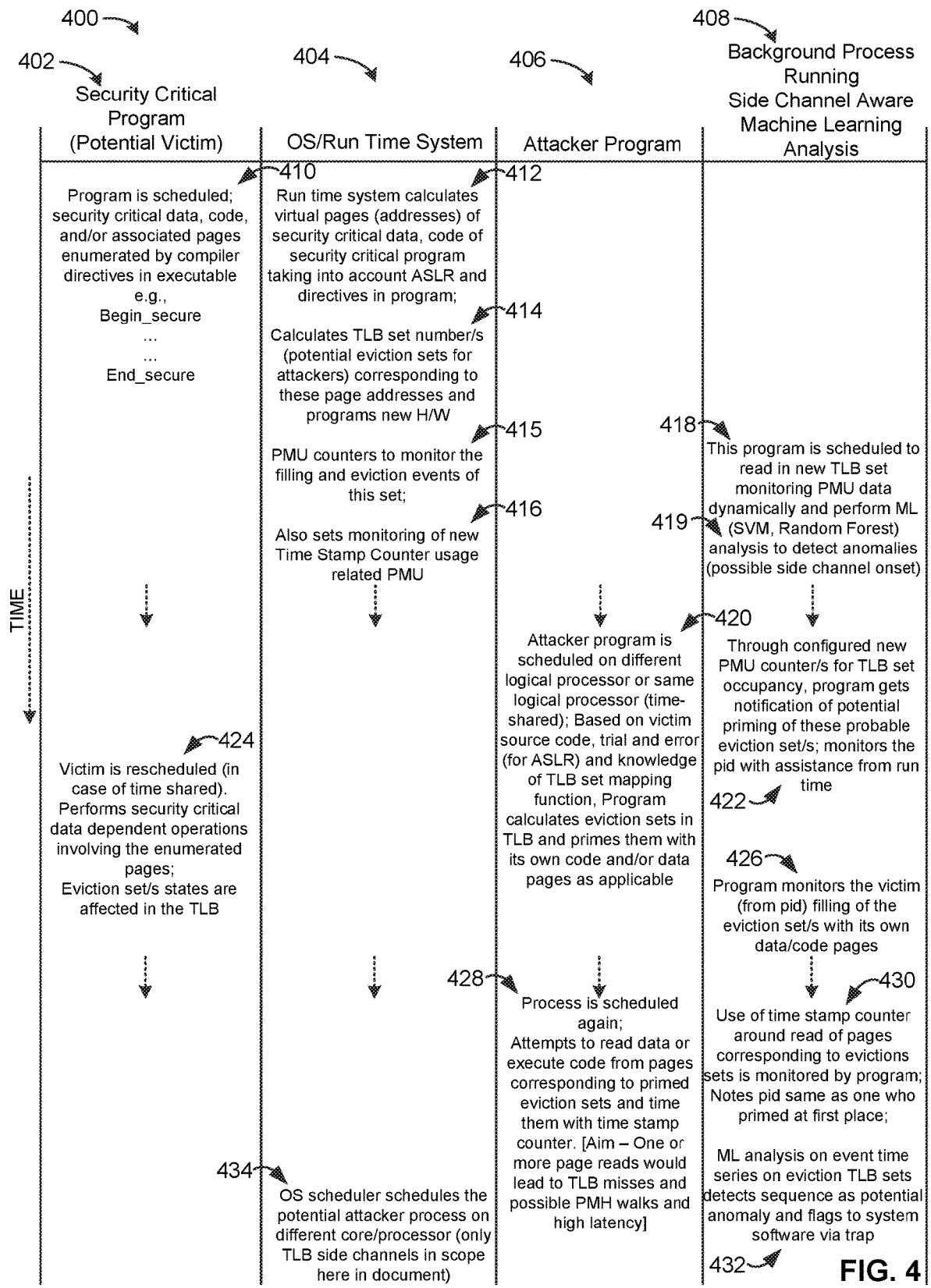
FIG. 4 is an illustration of the function of multiple systems operating in the example environment of use of FIG. 1 during the side channel attack of FIG. 3.

FIG. 4 illustrates example subsystem operations 400 of one or more components operating in the example environment of use 101 of FIG. 1 during a time period associated with the example micro-architectural side channel attack 300 of FIG. 3. In the illustrated example of FIG. 4, the subsystem operations 400 further include at least an example program (e.g., potential victim) operation 402, an example operating system operation 404, an example attack operation 406, and an example machine learning operation 408, wherein the machine learning operation 408, in some examples, is executed on the example memory access pattern anomaly detector 100 of FIG. 1.

As illustrated in FIG. 4, the example victim program 402 is scheduled and security critical data, code, and/or associated pages are enumerated by compiler directives in the executable (block 410). The example operating system operation 404 run time system calculates virtual pages (addresses) of security critical data, code, and/or pages of the victim program 402 taking into account ASLR and directives in the victim program 402 (block 412). The example operating system operation 404 also calculates TLB set numbers (e.g., potential eviction sets that may be attacked by the attacker 406) corresponding to the page addresses (414). The example operating system operation 404 also programs new counters in the PMU 106 to monitor the filling and eviction events of the TLB set (block 415). The example operating system operation 404 further sets monitoring of new counters within the PMU 106 (block 416).

The example machine learning engine 204 of the memory access pattern anomaly detector 100 is scheduled to read in the new TLB set monitoring data from the PMU 106 via the communication interface 202 (block 418). The example machine learning engine 204 perform machine learning (e.g., support vector machine random forest) analysis to detect anomalies (e.g., possible side channel onset) (block 419).

The example attacker program 406 is scheduled on a different logical processor or the same logical processor (e.g., via time-sharing) to calculate eviction sets in the TLB(s) 126, 128, and/or 134 and to prime them with its own code and/or data pages (e.g., based on victim source code, trial and error, and/or knowledge of the TLB set mapping function) (block 420).

The example machine learning engine 204 receives notification of the potential priming of the probably eviction sets (e.g., via the new TLB counters 144 A, B, C, D from the PMU 106) and monitors the PID with assistance from the runtime of the operating system 404 (block 422).

The example victim program 402 is rescheduled (e.g., due to time sharing) and performs security critical data dependent operations involving the enumerated pages such that the eviction set(s) states are affected in the example TLBs 126, 128, 134 (block 424).

The example machine learning engine 204 monitors the victim program 402 (e.g., via PID) filling the eviction set(s) with its own data/code pages (block 426).

The example attacker program 406 process is scheduled again and attempts to read data or execute code from pages corresponding to the primed eviction sets and attempts to time them with a time stamp counter of the PMU 106 (block 428). The attacker program 406 aims to have one or more pages read lead to TLB misses and possible PMH walks and high latency.

The example machine learning engine 204 monitors the counters in the PMU 106 related to read of pages corresponding to the eviction sets and notes the PID is the same as the one who primed the TLB in the first place (block 430). The machine learning engine 204 performs machine learning analysis on event time series on eviction TLB sets, which detects the sequence as potential anomaly and flags to system software (e.g., the operation system 404) via a trap (block 432).

The example operating system 404 schedules the potential attacker 406 on a different core/processor (block 434). Thus, the attacker 406 is detected and effectively blocked.

While an example manner of implementing the example memory access pattern anomaly detector 100 of FIG. 1 is illustrated in FIG. 2, one or more of the elements, processes and/or devices illustrated in FIG. 2 may be combined, divided, re-arranged, omitted, eliminated and/or implemented in any other way. Further, the example communication interface 202, the example machine learning engine 204, the alert generator 206 and/or, more generally, the example memory access pattern anomaly detector 100 of FIG. 2 may be implemented by hardware, software, firmware and/or any combination of hardware, software and/or firmware. Thus, for example, any of the example communication interface 202, the example machine learning engine 204, the alert generator 206 and/or, more generally, the example memory access pattern anomaly detector 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication interface 202, the example machine learning engine 204, and/or the example alert generator 206 is/are hereby expressly defined to include a non-transitory computer readable storage device or storage disk such as a memory, a digital versatile disk (DVD), a compact disk (CD), a Blu-ray disk, etc. including the software and/or firmware. Further still, the example memory access pattern anomaly detector 100 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
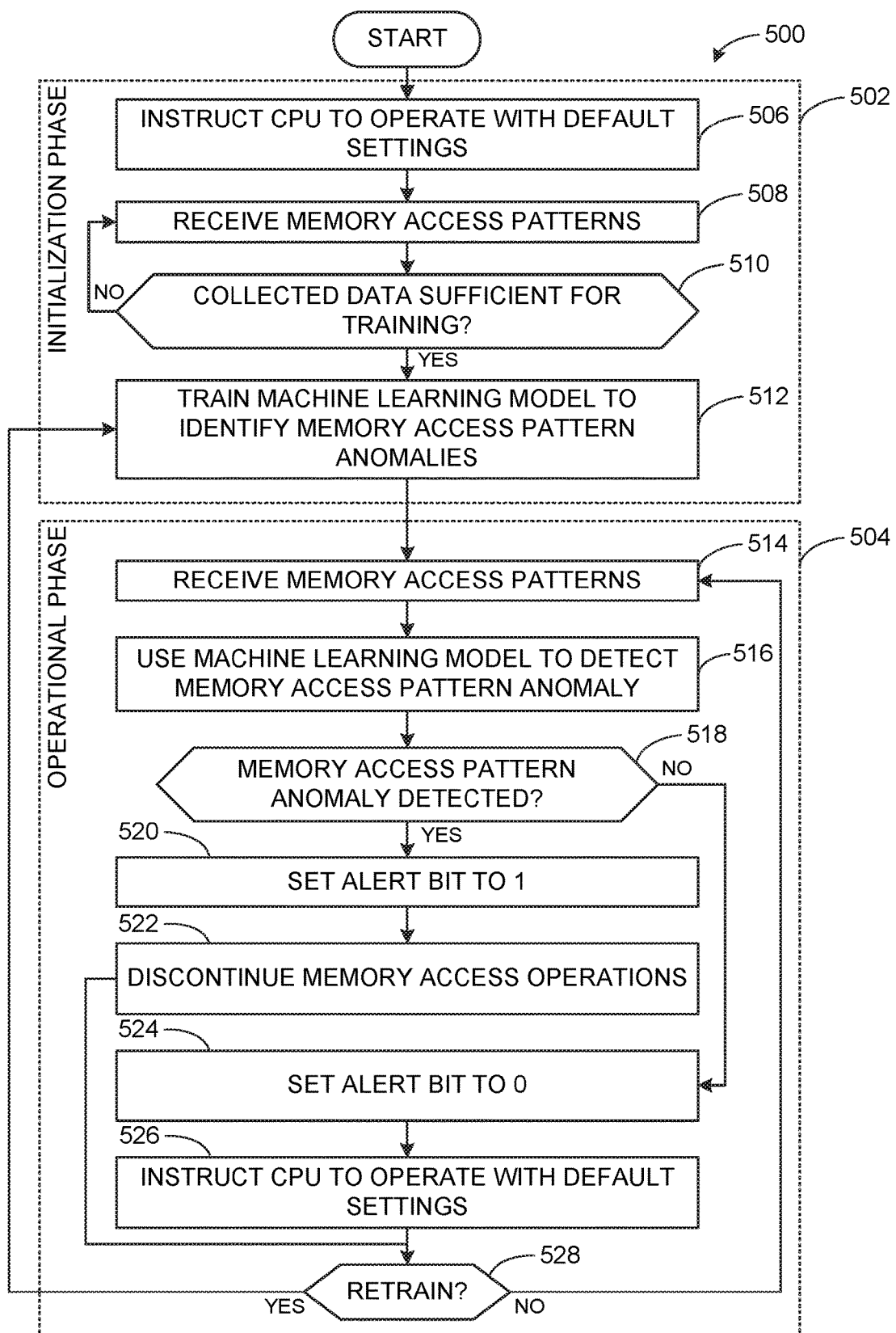
FIG. 5 is a flowchart representative of example machine readable instructions which may be executed to implement the example memory access pattern anomaly detector of FIGS. 1 and/or 2.

A flowchart representative of example hardware logic, machine readable instructions, hardware implemented state machines, and/or any combination thereof for implementing the memory access pattern anomaly detector 100 of FIG. 1 is shown in FIG. 5. The machine readable instructions may be an executable program or portion of an executable program for execution by a central processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 6, many other methods of implementing the example memory access pattern anomaly detector 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The program 500 of FIG. 5 includes an example initialization phase 502 (e.g., including training of the example machine learning engine 204) and an example operational phase 504 (e.g., including utilizing a model trained during the initialization phase 502 to detect anomalous memory access patterns). Returning to phase 502, the initialization phase 502 includes block 506 at which the memory access pattern anomaly detector 100 instructs the example CPU 102 of FIG. 1 to operate with default settings. At block 508, the memory access pattern anomaly detector 100, by way of the example communication interface 202, retrieves memory access patterns associated with the CPU 102 operating under the default settings set at block 506.

At block 510, the example machine learning engine 204 of FIG. 2 determines whether a quantity of memory access patterns retrieved from the CPU 102 is sufficient to train a machine learning model. In response to determining additional memory access patterns are required, processing returns to block 508. Alternatively, in response to determining sufficient data has been captured for training, processing proceeds to block 510 at which the machine learning engine 204 generates a machine learned model of memory access patterns using a machine learning technique (e.g., SVM training, GRU training, etc.). In response to the generation of the model, processing proceeds to the operation phase 504 by way of block 514.

At block 514, the example memory access pattern anomaly detector 100, by way of the example communication interface 202, retrieves a memory access pattern associated with the CPU 102. At block 516, the example machine learning engine 204 processes the memory access pattern with the trained model in an effort to detect any anomalies in the memory access pattern. At block 518, in response to the machine learning engine 204 indicating an anomaly in the memory access pattern, processing proceeds to block 520. Conversely, in response to the machine learning engine 204 indicating normal memory access patterns, processing proceeds to block 524.

At block 520, in response to an indication of an anomaly, the alert generator 206 sets an alert bit to 1 and, at block 522, the alert generator 206 is further to instruct the example CPU 102 of FIG. 1 to discontinue memory access operations. At block 524, in response to an indication of normal operation, the alert generator 206 sets an alert bit to 0 and, at block 526, instructs the example CPU 102 of FIG. 1 to continue operating with default settings. In response to completion of one of block 522 or block 526, the machine learning engine 204 determines whether retraining of the model is desired at block 528 and processing proceeds to block 512 (if retraining is needed) or processing proceeds to block 514 (if retraining is not needed).

Figure 6:
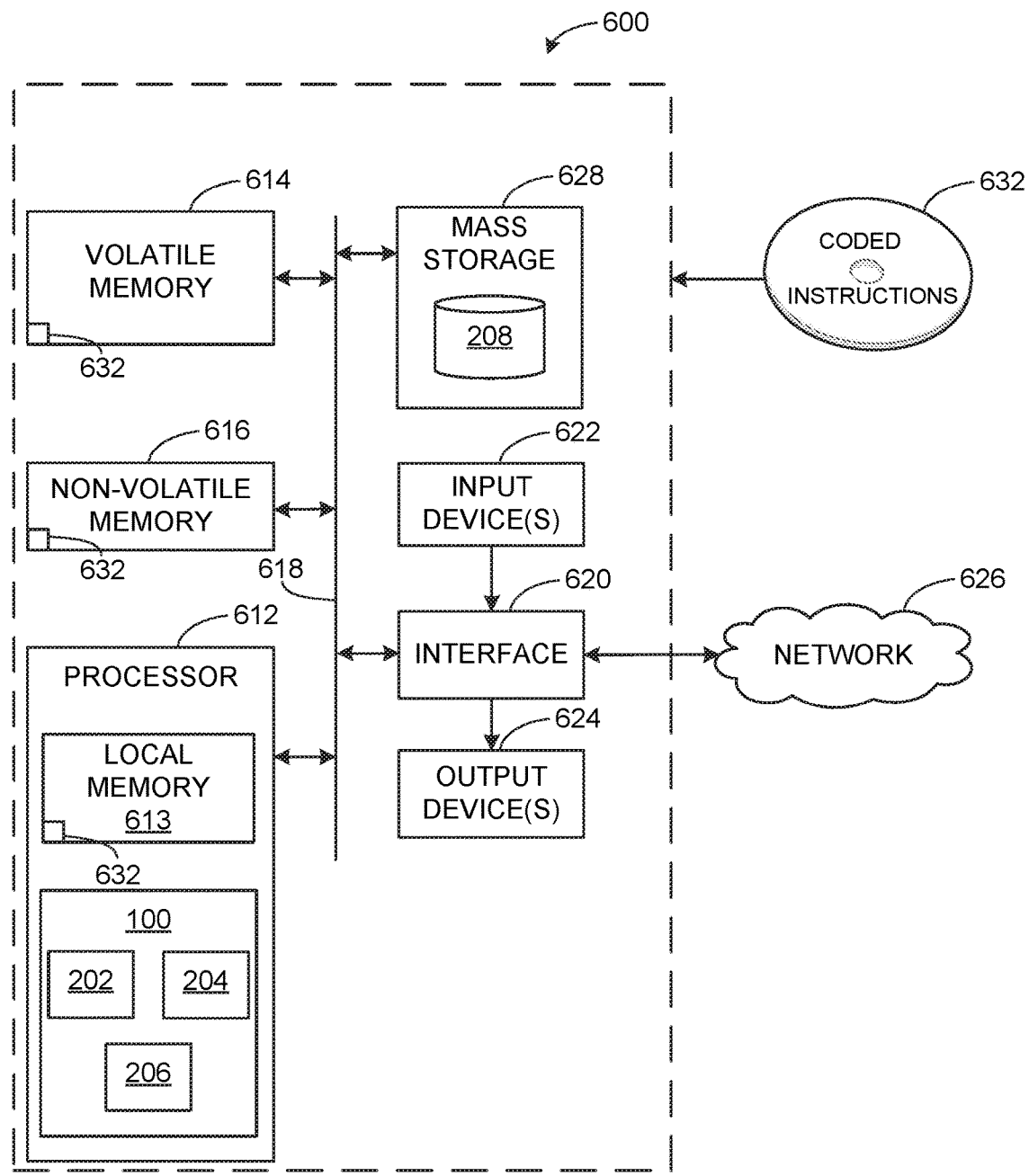
FIG. 6 is a block diagram of an example processing platform structured to execute the instructions of FIG. 5 to implement the example memory access pattern anomaly detector of FIGS. 1 and/or 2 to determine anomalous memory access patterns.

FIG. 6 is a block diagram of an example processor platform 600 structured to execute the instructions of FIG. 4 to implement the example memory access pattern anomaly detector 100 of FIG. 1. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example communication interface 202, the example machine learning engine 204, and the example alert generator 206.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIG. 5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that utilize machine learning techniques to detect anomalous memory access patterns. The disclosed methods, apparatus and articles of manufacture improve the efficiency of using a computing device by incorporating H/W modifications to a PMU of a CPU to decrease the computing resources required to detect anomalous memory access patterns. Additionally, the disclosed methods, apparatus and articles of manufacture are accordingly directed to one or more improvement(s) in the functioning of a computer. For example, detecting anomalous memory access patterns enhances the ability of the computer to detect a side channel attack via the TLB, thus enhancing the security of the computer against such attacks.

Example methods, apparatus, systems, and articles of manufacture of anomalous memory access pattern detection for translational lookaside buffers are disclosed herein. Further examples and combinations thereof include the following: example 1 includes an apparatus comprising a communication interface to retrieve a first eviction data set from a translational lookaside buffer associated with a central processing unit, a machine learning engine to generate an anomaly detection model based upon at least one of a second eviction data set not including an anomaly and a third eviction data set including the anomaly, and determine whether the anomaly is present in the first eviction data set based on the anomaly detection model, and an alert generator to at least one of modify a bit value or terminate memory access operations when the anomaly is determined to be present.

Example 2 includes an apparatus as defined in example 1, wherein the translational lookaside buffer includes a monitor to track access to the translational lookaside buffer.

Example 3 includes an apparatus as defined in example 2, wherein the monitor is to communicate information about the access to the translational lookaside buffer to a performance monitoring unit of the central processing unit.

Example 4 includes an apparatus as defined in example 3, wherein the performance monitoring unit includes counters to count accesses to the translational lookaside buffer.

Example 5 includes an apparatus as defined in example 3 or 4, wherein the performance monitoring unit includes event types corresponding to accesses to the translational lookaside buffer.

Example 6 includes an apparatus as defined in example 2, 3, 4, or 5, wherein the access is a hit on the translational lookaside buffer.

Example 7 includes an apparatus as defined in example 2, 3, 4 5, 6, or 7, wherein the access is a miss on the translational lookaside buffer.

Example 8 includes a method comprising retrieving a first eviction data set from a translational lookaside buffer associated with a central processing unit, generating an anomaly detection model based upon at least one of a second eviction data set not including an anomaly and a third eviction data set including the anomaly, determining whether the anomaly is present in the first eviction data set based on the anomaly detection model, and at least one of modifying a bit value or terminating memory access operations when the anomaly is determined to be present.

Example 9 includes a method as defined in example 8, wherein the translational lookaside buffer includes a monitor to track access to the translational lookaside buffer.

Example 10 includes a method as defined in example 9, further comprising communicating information about the access to the translational lookaside buffer to a performance monitoring unit of the central processing unit.

Example 11 includes a method as defined in example 10, wherein the performance monitoring unit includes counters to count accesses to the translational lookaside buffer.

Example 12 includes a method as defined in example 10 or 11, wherein the performance monitoring unit includes event types corresponding to accesses to the translational lookaside buffer.

Example 13 includes a method as defined in example 9, 10, 11, or 12, wherein the access is a hit on the translational lookaside buffer.

Example 14 includes a method as defined in example 9, 10, 11, 12, or 13, wherein the access is a miss on the translational lookaside buffer.

Example 15 includes a non-transitory computer readable medium comprising instructions that, when executed, cause a machine to at least retrieve a first eviction data set from a translational lookaside buffer associated with a central processing unit, generate an anomaly detection model based upon at least one of a second eviction data set not including an anomaly and a third eviction data set including the anomaly, determine whether the anomaly is present in the first eviction data set based on the anomaly detection model, and at least one of modify a bit value or terminate memory access operations when the anomaly is determined to be present.

Example 16 includes a non-transitory computer readable medium as defined in example 15, wherein the translational lookaside buffer includes a monitor to track access to the translational lookaside buffer.

Example 17 includes a non-transitory computer readable medium as defined in example 16, further comprising communicating information about the access to the translational lookaside buffer to a performance monitoring unit of the central processing unit.

Example 18 includes a non-transitory computer readable medium as defined in example 17, wherein the performance monitoring unit includes counters to count accesses to the translational lookaside buffer.

Example 19 includes a non-transitory computer readable medium as defined in example 17 or 18, wherein the performance monitoring unit includes event types corresponding to accesses to the translational lookaside buffer.

Example 20 includes a non-transitory computer readable medium as defined in example 16, 17, 18, or 19, wherein the access is a hit on the translational lookaside buffer.

Example 21 includes a non-transitory computer readable medium as defined in example 16, 17, 18, 19, or 20, wherein the access is a miss on the translational lookaside buffer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a communication interface to retrieve a first eviction data set from a translational lookaside buffer associated with a central processing unit;
    a machine learning engine to:
        generate an anomaly detection model based upon at least one of a second eviction data set not including an anomaly and a third eviction data set including the anomaly; and
        obtain a notification of a process identifier of a process performing a priming of a first eviction set;
        determine that the process with the process identifier is the same process that reads pages corresponding to the first eviction set;
        perform machine learning analysis on event time series of the first eviction set to determine whether the anomaly is present in the first eviction data set based on the anomaly detection model; and
    an alert generator to at least one of modify a bit value or terminate memory access operations when the anomaly is determined to be present.

2. An apparatus as defined in claim 1, wherein the translational lookaside buffer includes a monitor to track access to the translational lookaside buffer.

3. An apparatus as defined in claim 2, wherein the monitor is to communicate information about the access to the translational lookaside buffer to a performance monitoring unit of the central processing unit.

4. An apparatus as defined in claim 3, wherein the performance monitoring unit includes counters to count accesses to the translational lookaside buffer.

5. An apparatus as defined in claim 3, wherein the performance monitoring unit includes event types corresponding to accesses to the translational lookaside buffer.

6. An apparatus as defined in claim 2, wherein the access is a hit on the translational lookaside buffer.

7. An apparatus as defined in claim 2, wherein the access is a miss on the translational lookaside buffer.

8. A method comprising:
    retrieving a first eviction data set from a translational lookaside buffer associated with a central processing unit;
    generating an anomaly detection model based upon at least one of a second eviction data set not including an anomaly and a third eviction data set including the anomaly;
    obtaining a notification of a process identifier of a process performing a priming of a first eviction set;
    determining that the process with the process identifier is the same process that reads pages corresponding to the first eviction set;
    performing machine learning analysis on event time series of the first eviction set to determine whether the anomaly is present in the first eviction data set based on the anomaly detection model; and
    at least one of modifying a bit value or terminating memory access operations when the anomaly is determined to be present.

9. A method as defined in claim 8, wherein the translational lookaside buffer includes a monitor to track access to the translational lookaside buffer.

10. A method as defined in claim 9, further comprising communicating information about the access to the translational lookaside buffer to a performance monitoring unit of the central processing unit.

11. A method as defined in claim 10, wherein the performance monitoring unit includes counters to count accesses to the translational lookaside buffer.

12. A method as defined in claim 10, wherein the performance monitoring unit includes event types corresponding to accesses to the translational lookaside buffer.

13. A method as defined in claim 9, wherein the access is a hit on the translational lookaside buffer.

14. A method as defined in claim 9, wherein the access is a miss on the translational lookaside buffer.

15. A non-transitory computer readable medium comprising instructions that, when executed, cause a machine to at least:
    retrieve a first eviction data set from a translational lookaside buffer associated with a central processing unit;

generate an anomaly detection model based upon at least one of a second eviction data set not including an anomaly and a third eviction data set including the anomaly;

obtain a notification of a process identifier of a process performing a priming of a first eviction set;

determine that the process with the process identifier is the same process that reads pages corresponding to the first eviction set;

perform machine learning analysis on event time series of the first eviction set to determine whether the anomaly is present in the first eviction data set based on the anomaly detection model; and at least one of modify a bit value or terminate memory access operations when the anomaly is determined to be present.

16. A non-transitory computer readable medium as defined in claim 15, wherein the translational lookaside buffer includes a monitor to track access to the translational lookaside buffer.

17. A non-transitory computer readable medium as defined in claim 16, further comprising communicating information about the access to the translational lookaside buffer to a performance monitoring unit of the central processing unit.

18. A non-transitory computer readable medium as defined in claim 17, wherein the performance monitoring unit includes counters to count accesses to the translational lookaside buffer.

19. A non-transitory computer readable medium as defined in claim 17, wherein the performance monitoring unit includes event types corresponding to accesses to the translational lookaside buffer.

20. A non-transitory computer readable medium as defined in claim 16, wherein the access is a hit on the translational lookaside buffer.

21. A non-transitory computer readable medium as defined in claim 16, wherein the access is a miss on the translational lookaside buffer.

* * * * *